United States Patent
Masuki et al.

(10) Patent No.: US 10,355,434 B2
(45) Date of Patent: Jul. 16, 2019

(54) CLAMP AND BUS BAR MODULE

(71) Applicant: YAZAKI CORPORATION, Tokyo (JP)

(72) Inventors: Hideto Masuki, Shizuoka (JP); Shinichi Yanagihara, Shizuoka (JP); Yuki Hashimoto, Shizuoka (JP); Motoo Nojima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/005,616

(22) Filed: Jun. 11, 2018

(65) Prior Publication Data
US 2018/0358766 A1 Dec. 13, 2018

(30) Foreign Application Priority Data

Jun. 13, 2017 (JP) .................................. 2017-115631

(51) Int. Cl.
 *H01R 4/28* (2006.01)
 *H01R 25/16* (2006.01)
 *H01M 2/20* (2006.01)

(52) U.S. Cl.
 CPC .......... *H01R 25/162* (2013.01); *H01M 2/202* (2013.01); *H01R 4/28* (2013.01)

(58) Field of Classification Search
 CPC ........ H01R 25/162; H01R 4/28; H01M 2/202
 See application file for complete search history.

(56) References Cited

U.S. PATENT DOCUMENTS

| | | | | |
|---|---|---|---|---|
| 3,920,306 | A * | 11/1975 | Barnett, Jr. | H01R 9/00 439/459 |
| 5,315,062 | A * | 5/1994 | Hoshino | H01R 13/506 174/72 C |
| 5,391,092 | A * | 2/1995 | Sunnida | H01R 13/516 439/470 |
| 6,203,362 | B1 * | 3/2001 | Tsuji | H01R 13/506 439/470 |
| 6,962,504 | B2 * | 11/2005 | Fukui | H01R 13/562 439/466 |
| 7,537,478 | B2 * | 5/2009 | Foltz | H02G 3/0487 439/466 |
| 2012/0208389 | A1 * | 8/2012 | Nakatsuji | H01R 4/2404 439/345 |
| 2013/0260619 | A1 * | 10/2013 | Wallner | H01R 9/2425 439/709 |

FOREIGN PATENT DOCUMENTS

JP 2014-233159 A 12/2014

* cited by examiner

*Primary Examiner* — Truc T Nguyen
(74) *Attorney, Agent, or Firm* — Kenealy Vaidya LLP

(57) ABSTRACT

A clamp includes a clamp base part having a first step, a hinge part that is formed on a thinned portion connected continuously to the clamp base part, a clamp moving part having a second step, and a plurality of retention parts formed in a state that the clamp moving part is engaged with the clamp base part. The clamp base part is provided on a structure in which a cable and/or an electric wire is routed and formed such that the cable and/or the electric wire is placed thereon. One end of the clamp moving part is connected continuously to the hinge part, the other end of the clamp moving part is engaged with the clamp base part, and the cable and/or the electric wire is covered from the one end to a middle portion of the clamp moving part.

10 Claims, 10 Drawing Sheets

CLAMP AND BUS BAR MODULE

CROSS REFERENCE TO RELATED APPLICATIONS

This application claims priority from Japanese Patent Application No. 2017-115631 filed on Jun. 13, 2017, the entire contents of which are incorporated herein by reference.

BACKGROUND OF THE INVENTION

Field of the Invention

The present invention relates to a clamp that retains a cable and/or an electric wire, and a bus bar module that has the clamp.

Description of Related Art

Figure 10A:
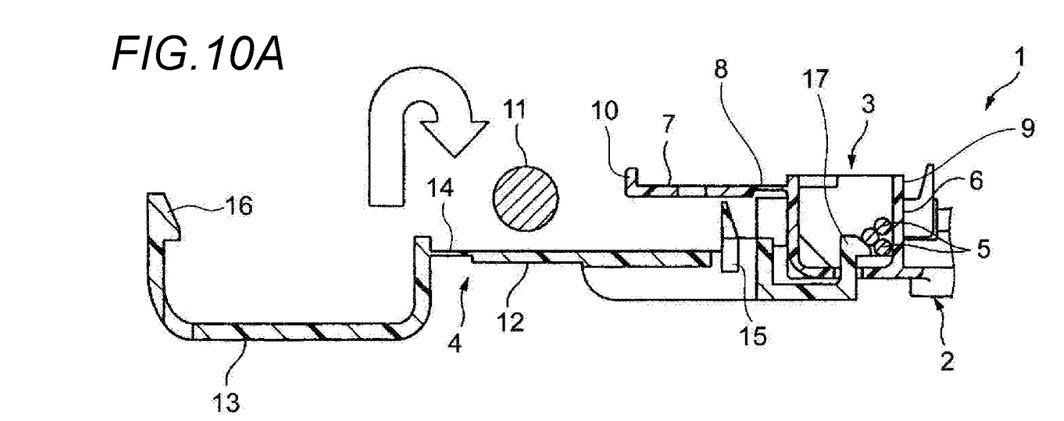
FIG. 10A is a cross-sectional view of a state where a lid is opened.

In FIG. 10A, the reference numeral 1 indicates a bus bar module in a related art (see, for example, the patent document 1: JP-A-2014-233159). A bus bar module 1 is assembled to a battery assembly that is mounted in a hybrid vehicle or an electric vehicle. The bus bar module 1 is configured to include a bus bar having a conductive property, a voltage detection terminal that comes into contact with the bus bar, a resin plate 2 having an insulating property, that is formed by arranging a plurality of bus bar accommodation parts which accommodates and fixes the bus bar and the voltage detection terminal side by side in the longitudinal direction, an electric wire accommodation part 3 that is integrally formed with the resin plate 2, and a cable clamp 4 that is assembled to the electric wire accommodation part 3.

The electric wire accommodation part 3 is a portion for accommodating a plurality of electric wires 5, and has an accommodation-part main body 6, a lid 7, a hinge part 8 that connects the accommodation-part main body 6 and the lid 7 to each other, a main body-side lock portion 9 that is formed on the accommodation-part main body 6, and a lid-side lock portion 10 that is formed on the lid 7. Furthermore, the cable clamp 4 is a portion for retaining a cable 11, and has a clamp main body 12, a lid 13, and a hinge part 14 that connects the clamp-part main body 12 and the lid 13 to each other, a main body-side lock portion 15 that is formed on the clamp-part main body 12, a lid-side lock portion 16 that is formed on the lid 13, and an assembly lock portion 17 as a portion that is assembled to the electric wire accommodation part 3.
[Patent Document 1] JP-A-2014-233159

Figure 10B:
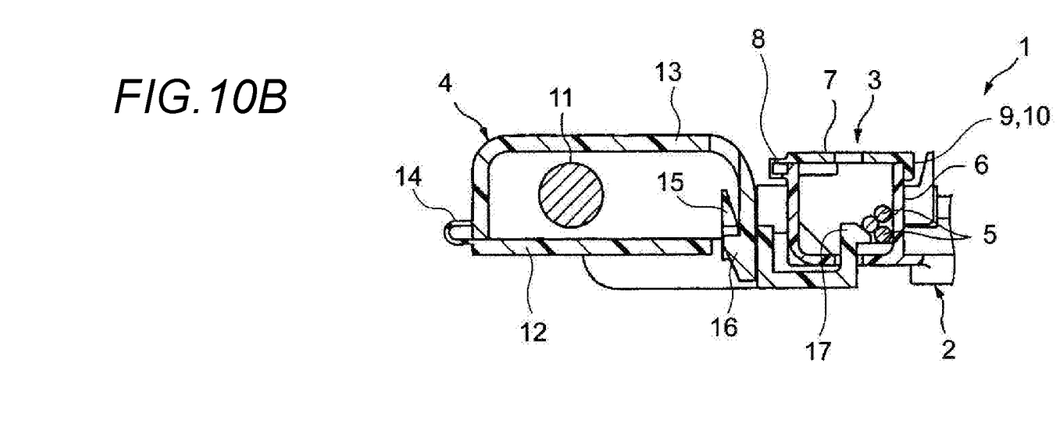
FIG. 10B is a cross-section view where the lid is closed.

According to a related art, regarding an operation at a place that is illustrated in FIGS. 10A and 10B, an operation for accommodating a plurality of electric wires 5 and an operation for retaining the cable 11 have to be performed. Furthermore, as understood from FIGS. 10A and 10B, a structure is employed in which the lid 13 cannot close the cable clamp 4 without closing the electric wire accommodation part 3 by the lid 7. Therefore, there is a problem in that workability is not excellent.

SUMMARY

One or more embodiments provide a clamp that has excellent workability and a bus bar module that has the clamp.

In an aspect (1), a clamp includes a clamp base part having a first step, a hinge part that is formed on a thinned portion connected continuously to the clamp base part, a clamp moving part having a second step, and a plurality of retention parts formed in a state that the clamp moving part is engaged with the clamp base part. The clamp base part is provided on a structure in which a cable and/or an electric wire is routed and formed such that the cable and/or the electric wire is placed thereon. One end of the clamp moving part is connected continuously to the hinge part, the other end of the clamp moving part is engaged with the clamp base part, and the cable and/or the electric wire is covered from the one end to a middle portion of the clamp moving part. The first step and the second step are positioned between the plurality of retention parts. One or multiple partition portions, which is positioned between adjacent two retention parts of the plurality of retention parts, are formed on the clamp moving part.

According to the aspect (1), an operation of engaging the clamp moving part with the clamp base part through the hinge part is performed and thus the plurality of retention parts are formed in a state of being partitioned with the partition portion of the clamp moving part. Accordingly, for example, an operation of accommodating the plurality of electric wires and an operation of retaining the cable can be performed at once. According to the present invention, because the plurality of retention parts are formed in the state of being partitioned with the partition portion, for example, the cable and the electric wires can be prevented from being mixed.

In an aspect (2), a bus bar module includes a plurality of bus bars connecting adjacent battery cells in a battery assembly in series, a resin plate including a plurality of bus bar accommodation parts which accommodate and fix the bus bars and which are arranged in the longitudinal direction. The clamp according to claim 1 is integrally formed with the resin plate.

According to the aspect (2), because the clamp that is recited in claim 1 is integrally formed with the resin plate, for example, in the bus bar module, an operation of accommodating the plurality of electric wires and an operation of maintaining the cable can be performed at once.

According to one or more embodiments, a clamp that has excellent workability and a bus bar module that has that clamp can be achieved.

BRIEF DESCRIPTION OF THE DRAWINGS

FIGS. 10A and 10B are cross-sectional views illustrating a portion of a bus bar module in the related art.

DETAILED DESCRIPTION

A bus bar module is configured to include a plurality of bus bars having an electric conductive property for connecting adjacent battery cells in a battery assembly in series, and a resin plate having an insulating property, which is formed by arranging a plurality of bus bar accommodation parts which are destinations of the bus bars for accommodation and fixation side by side in the longitudinal direction. The resin plate has a clamp that is set to perform an operation of accommodating a plurality of electric wires and an operation of maintaining a cable at once.

The clamp has a clamp base part, a hinge part, and a clamp moving part, and a plurality of retention parts are formed in a state where the clamp moving part is engaged with the clamp base part. The plurality of retention parts are arranged in a substantially stepwise manner. One or multiple partition portions, which is positioned between the adjacent retention parts among the plurality of retention parts, are formed on the clamp moving part.

Embodiment

Figure 1A:
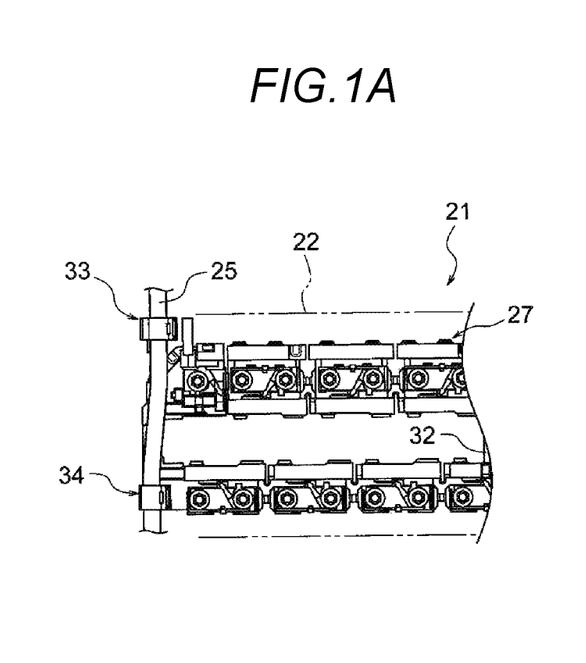
FIGS. 1A and 1B are a plan-view view and an essential-part-enlarged view, respectively, which illustrate an embodiment of a bus bar module that has a clamp according to the present invention.
Figure 1B:
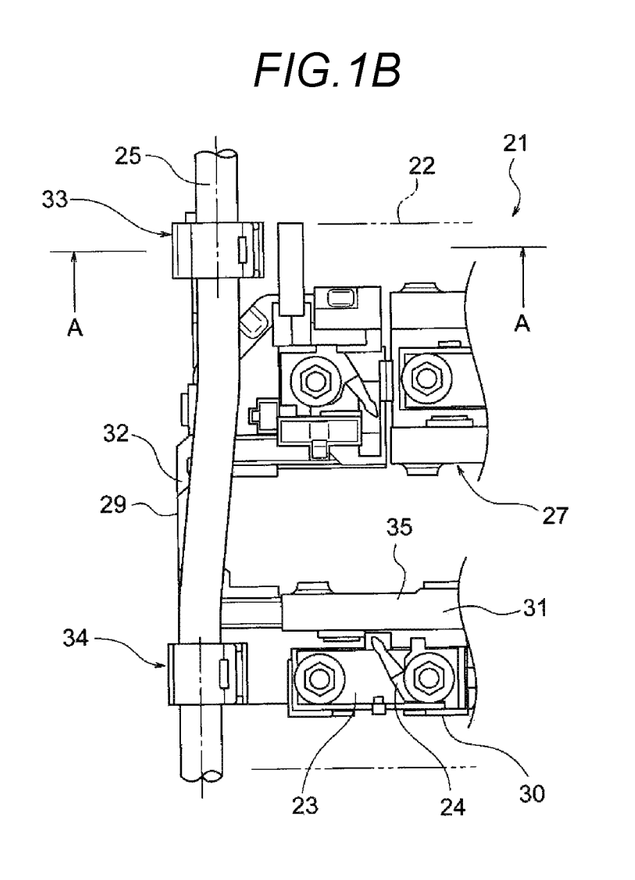
Figure 2:
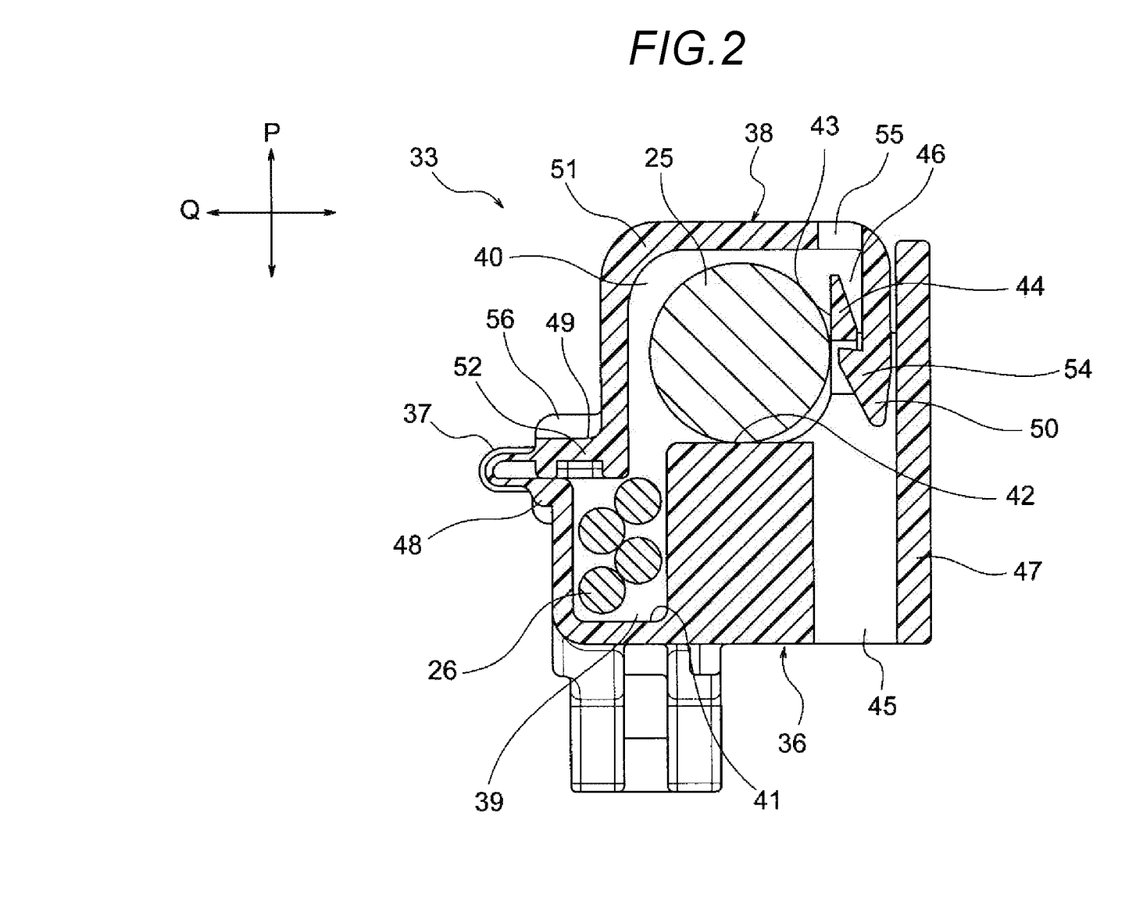
FIG. 2 is a cross-sectional view taken along line A-A in FIG. 1B.
Figure 3:
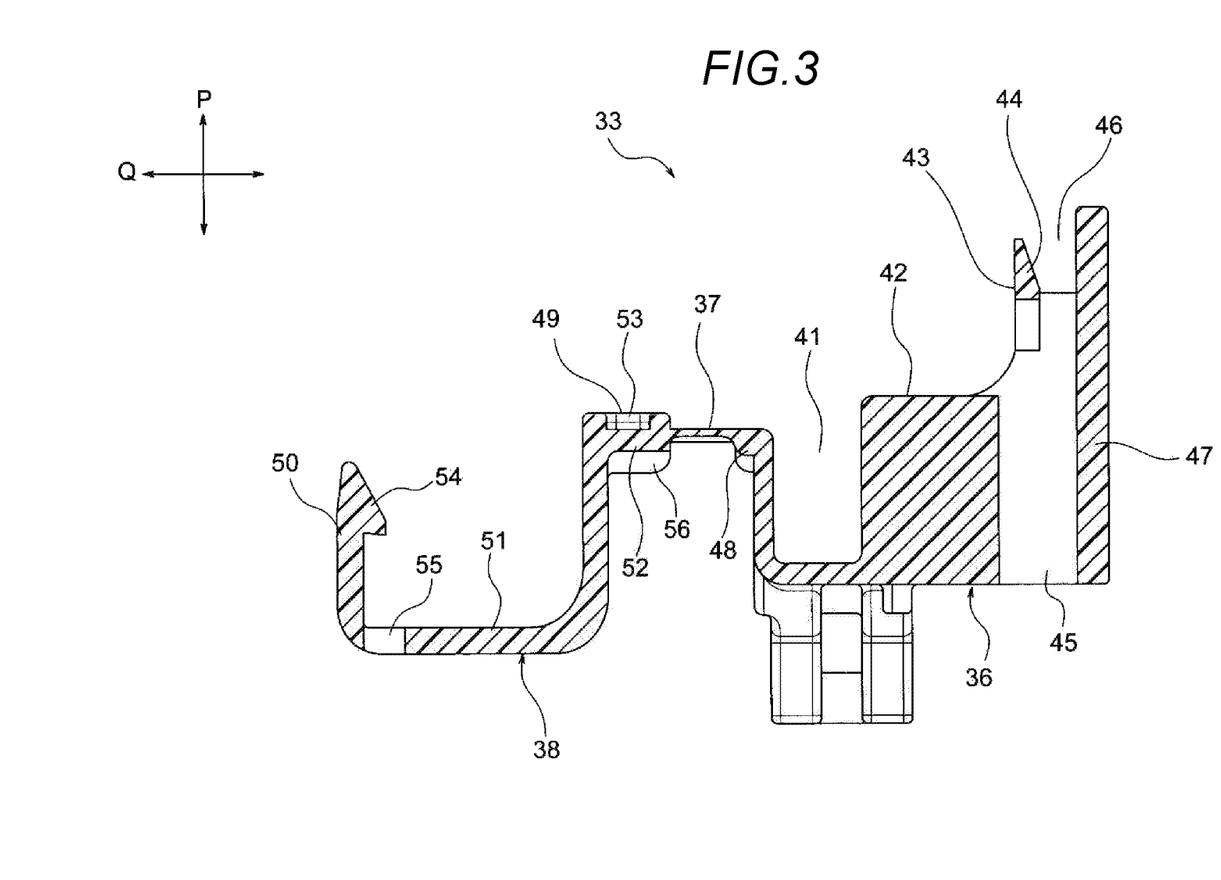
FIG. 3 is a cross-sectional view illustrating an opened state of the clamp in FIG. 2.
Figure 4:
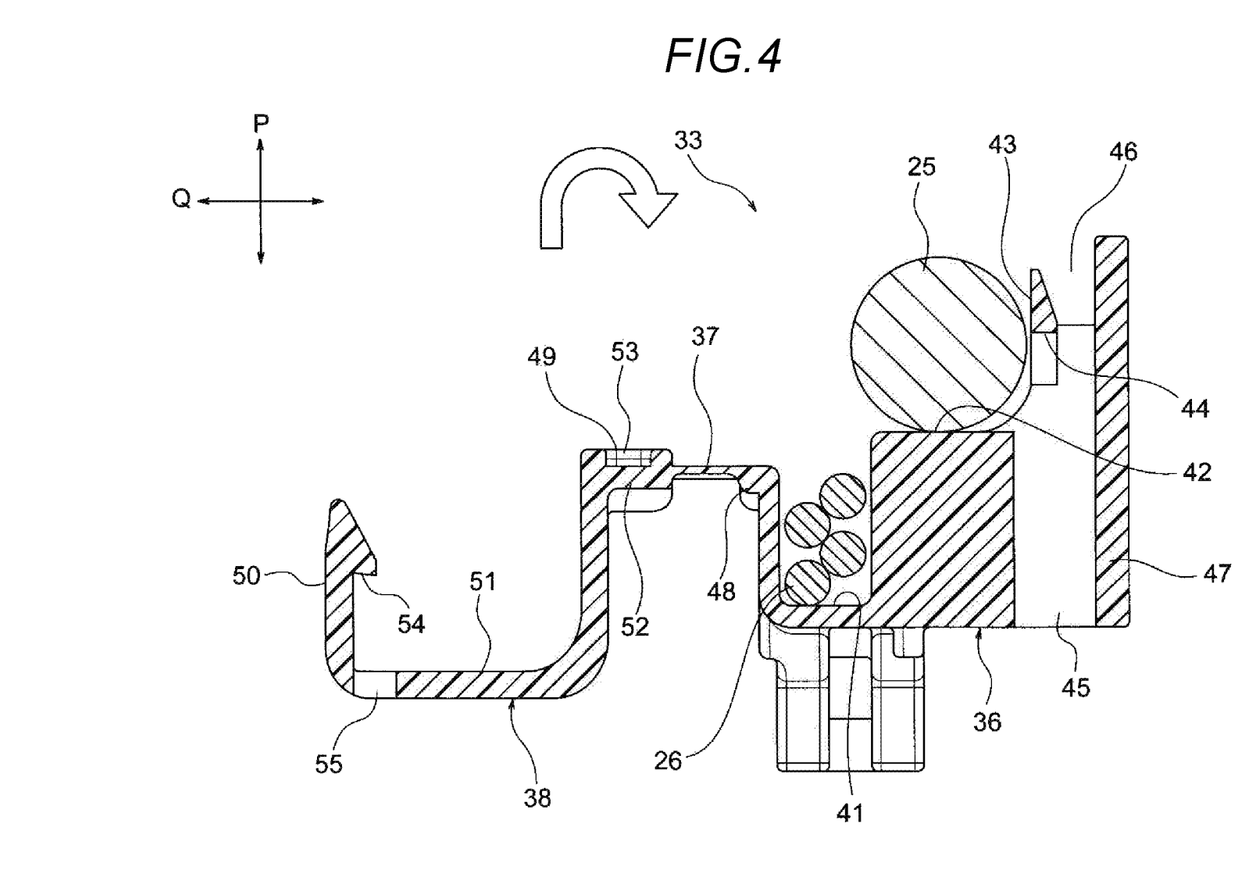
FIG. 4 is a cross-sectional view illustrating a state where a cable and an electric wire are installed in a clamp base part.

An embodiment will be described below with reference to the drawings. FIGS. 1A and 1B are views illustrating an embodiment of a bus bar module that has a clamp according to the present invention. FIG. 2 is a cross-sectional view taken along line A-A in FIG. 1B. FIG. 3 is a cross-sectional view illustrating an opened state of the clamp in FIG. 2. FIG. 4 is a cross-sectional view illustrating a state where a cable and an electric wire are installed in the clamp base part. FIGS. 5 to 9 are perspective views of the clamp.

<Bus Bar Module 21>

In FIGS. 1A and 1B, the bus bar module 21 is assembled to a battery assembly 22 that is mounted in a hybrid vehicle or an electric vehicle, and is configured to include a plurality of bus bars 23, a plurality of voltage detection terminals 24, a high voltage cable 25, a plurality of low voltage electric wire 26 (refer to FIGS. 2 and 4), a resin plate 27, and the like. The bus bar module 21 has the structural characteristic that a clamp 33 (which will be described below) is integrally formed with the resin plate 27.

<Bus Bar 23 and Voltage Detection Terminal 24>

In FIG. 1, the bus bar 23 is included in order to connect the adjacent battery cells in the battery assembly 22 in series. The bus bar 23 is formed by press-processing a metal plate having an electric conductive property. The voltage detection terminal 24 has an electric contact portion and an electric wire connection portion, and is connected to a battery cell in a state where the electric contact portion overlaps the bus bar 23 to come into contact with the bus bar 23. The voltage detection terminal 24 is formed by press-pressing a thin metal plate having an electric conductive property. A terminal of the electric wire 26 is connected to the electric wire connection portion of the voltage detection terminal 24. The voltage detection terminal 24 is connected to an electronic control part through the electric wire 26. The bus bar 23 and the voltage detection terminal 24 that are employed in the present embodiment are the same as those in the related art.

<Cable 25 and Electric Wire 26>

Figure 6:
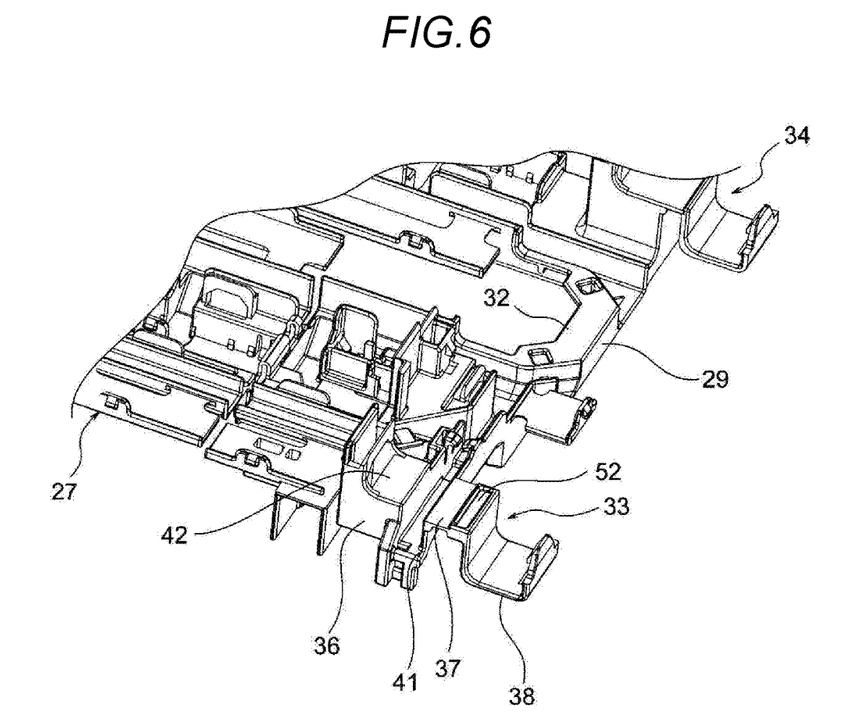
FIG. 6 is a perspective view (in which the clamp is opened and the cable and the electric wire are not present) of the clamp.

In FIGS. 1A, 1B and 6, the cable 25 is configured to include a conductor (a core wire) having an electric conductive property, and an insulation material (an insulation cover) that has an insulation property, which covers the conductor. The cable 25 is a well-known electric wire sheathed in cloth, and has the flexibility that is the ability to be resilient but bent. In the present embodiment, the cable 25 is routed along a short-end flank portion 29 (one flank portion) of the resin plate 27. The electric wire 26 has a well-known thin electric wire, and has an electric conductor and an insulating material. The electric wire 26, as described above, is connected to the electric wire connection portion of the voltage detection terminal 24, and is routed to the resin plate 27. The other end of the electric wire 26 is connected to the electronic control part as described above. The cable 25 and the electric wire 26 that are employed in the present embodiment are the same as those in the related art. It is assumed that the term "cable 25" may be replaced with an "electric wire 25" or a "cloth-sheathed electric wire 25."

<Resin Plate 27>

In FIGS. 1A, 1B and 4, the resin plate 27 is a resin-molded product that has a comparatively high insulation property, which is assembled to, for example, an upper surface or the like (a surface on which an electrode is present) of the battery assembly 22, and has a plurality of bus bar accommodation parts 30, a plurality of electric wire accommodation parts 31, a plurality of bridge parts 32, and clamps 33 and 34 in a pair. In the present embodiment, the resin plate 27 is equivalent to a "structure" that is recited in Claim. The clamp 33 has the structural characteristic (it is assumed that the clamp 34 may have the same structure as the clamp 33).

A plurality of bus bar accommodation parts 30 are arranged side by side along the longitudinal direction of the resin plate 27. The bus bar 23 and the voltage detection terminal 24 are accommodated and fixed in the bus bar accommodation part 30. The plurality of electric wire accommodation parts 31 are formed as portions that accommodate the electric wire 26 which is connected to the voltage detection terminal 24. The plurality of electric wire accommodation parts 31 each have an accommodation-part main body and a lid 35. It is assumed that a path along which the electric wire 26 is routed is a path along which the electric wire 26 runs from the short-end flank portion 29 (one flank portion) of the resin plate 27 toward the clamp 33 through the electric wire accommodation part 31 and extends toward the electronic control part side. Portions other than the clamps 33 and 34 (which will be described below) in the resin plate 27, which are employed in the present embodiment, have the same as those in the related art.

The plurality of bridge parts 32 are formed as portions that connect a plurality of bus bar accommodation parts 30 in a row that are arranged side by side along the longitudinal direction of the resin plate 27. Among the plurality of bridge parts 32, a portion of the electric wire 26, which is to be routed, is formed on the bridge part 32 positioned on the short-end flank portion 29 (one flank portion). The cable 25 is routed above the bridge part 32.

<Clamp 33>

In FIGS. 1A to 4, the clamp 33 is used as a cable retention portion when the cable 25 is routed along the short-end flank portion 29 (one flank portion). The clamp 33 is also used as an electric wire accommodation portion before the plurality of electric wires 26 are caused to extend toward the electronic control part side. The clamp 33 is configured to have a clamp base part 36, a hinge part 37, and a clamp moving part 38. The clamp 33 may be configured to have a plurality of (two) retention parts 39 and 40, which are formed in a state where the clamp moving part 38 is engaged with the clamp base part 36.

<Clamp Base Part 36>

In FIGS. 2 to 4, the clamp base part 36 is formed such that the cable 25 and the plurality of electric wires 26, as illustrated in FIG. 4, are placed on a portion of the clamp base part 36 when retaining the cable 25 and accommodating the plurality of electric wires 26.

When an arrow P and an arrow Q in FIGS. 2 to 4 are defined as indicating the upward-downward direction and the leftward-rightward direction, respectively, for a little more specific description, an electric wire accommodation groove portion 41 is formed to the lower-left side of the clamp base part 36. The plurality of electric wires 26 are accommodated in the electric wire accommodation groove portion 41. The plurality of electric wires 26 are placed in a state where the electric wires 26 are placed on top of one another, starting from the bottom of the electric wire accommodation groove portion 41. That is, the electric wire accommodation groove portion 41 is formed in the clamp base part 36 such that the plurality of electric wires 26 are placed on a portion of the electric wire accommodation groove portion 41.

In approximately the center of the clamp base part 36, a cable placement portion 42 and a cable support wall 43 are formed to the upper-right side (in a portion that is one step raised from the electric wire accommodation groove portion 41) of the electric wire accommodation groove portion 41. The cable 25 is placed on the cable placement portion 42. The cable support wall 43 is a position regulation portion for not causing the cable 25 to move rightward. The cable support wall 43 is formed such that the cable support wall 43 has the same function as a groove flank surface of the electric wire accommodation groove portion 41. The cable support wall 43 is formed such that a cross-section of the cable support wall 43 and a cross-section of the cable placement portion 42 constitute the letter L together with each other, when viewed from the side.

A base-side lock portion 44 is formed on the upper portion of the cable support wall 43. The base-side lock portion 44 is formed as a portion with which the clamp moving part 38 is engaged. The base-side lock portion 44 is formed to have a well-known shape of engagement protrusion. The reference numeral 45 indicates a die cutting hole for forming the base-side lock portion 44. The reference numeral 46 indicates an engagement opening when the clamp moving part 38 is engaged. The reference numeral 47 indicates a right flank wall in the clamp 33. An upper end of the right flank wall 47 is formed to be positioned upper from the base-side lock portion 44.

<Hinge Part 37>

In FIGS. 2 to 4, the hinge part 37 is formed as a portion that links the clamp base part 36 and the clamp moving part 38 to each other. The hinge part 37 is a well-known hinge and is formed to have the shape of a thin band strip. The hinge part 37 is formed such that the hinge part 37 repeatedly performs an operation of changing a state of being straight to a state of being U-shaped or returning from the state of being U-shaped to the state of being straight. One end of the hinge part 37 is linked to the electric wire accommodation groove portion 41. Specifically, the one end of the hinge part 37 is linked to a convex portion 48 that protrudes leftward from an opening edge portion. The other end of the hinge part 37 is linked to the clamp moving part 38.

<Clamp Moving Part 38>

In FIGS. 2 to 4, the clamp moving part 38 is formed such that one end 49 of the clamp moving part 38 connects continuously to the hinge part 37, such that the other end 50 is engaged with the clamp base part 36, and such that a portion from the one end 49 to a middle portion 51 thereof covers the electric wire 26 and the cable 25.

If a description is provided referring to an open state that is illustrated in FIG. 3, the clamp moving part 38 is formed such that the one end 49 has a convex shape to the left side of the hinge part 37. The clamp moving part 38 is continuously formed. The one end 49 itself is formed as a partition portion 52 (which will be described below) in the present embodiment. As understood from the following description, it is assumed that a linear dimension for the one end 49 is set considering an opening width of the electric wire accommodation groove portion 41 or a diameter of the electric wire 26. The reference number 53 in the one end 49 indicates a thinned portion.

The middle portion 51 is formed to make a band plate to a L shape. It is assumed that the linear dimension for the middle portion 51 in the shape of the letter L is set considering a diameter of the cable 25. In the present embodiment, it is assumed that the linear dimension in a state where the cable 25 is movable in an axis direction thereof is set (no limitation to this is imposed, and the linear dimension for pressing the cable 25 may be set).

The other end 50, as described above, is formed such that the other end 50 is engaged with the clamp base part 36. A movable-side lock portion 54 is formed on the other end 50. The movable-side lock portion 54 is formed in the well-known shape of a lock arm. In order to form the movable-side lock portion 54, a die cutting hole 55 is formed in a continuous connection portion between the middle portion 51 and the other end 50.

As understood from the "open" state that is illustrated in FIG. 3, the clamp moving part 38 is formed in such a shape that the entire clamp moving part 38 has the flexibility (in the case of the present embodiment, it is assumed that a reinforcing rib 56 is formed on the one end 49 and that this portion has higher strength than other portions).

<Partition Portion 52>

In FIGS. 2 to 4, the partition portion 52 is positioned between the electric wire accommodation groove portion 41 and the cable placement portion 42, and is formed such that that the partition portion 52 functions as a partition. In other words, the partition portion 52 is formed such that the partition portion 52 is positioned between two retention parts 39 and 40. The partition portion 52 is formed such that a division into a plurality of electric wires 26 and a plurality of electric wires 26 is made. It is assumed that the partition portions 52 are formed such that the number of partition portions is obtained by subtracting 1 from the sum of the number of retention parts 39 and the number of retention parts 40. In the present embodiment, because two retention parts 39 and 40 are present, one partition portion 52, as illustrated, is present.

The partition portion 52 is formed such that an opening portion in the electric wire accommodation groove portion 41 is opened. It is assumed that, as illustrated in FIG. 2, the partition portion 52 may not entirely open the opening portion in the electric wire accommodation groove portion 41, and a gap that has a smaller diameter than the electric wire 26 may occur. The partition portion 52 is formed such that the electric wire 26 does not move to the side of the cable 25.

<Retention Parts 39 and 40>

In FIG. 2, the retention parts 39 and 40 are formed in a state where the clamp moving part 38 is engaged with the clamp base part 36. The retention part 39 is formed as an accommodation space for the plurality of electric wires 26 and the retention part 40 is formed as an accommodation space for the cable 25. The retention parts 39 and 40 are formed to be arranged side by side stepwise in an obliquely rightward direction. In the present embodiment, two retention parts are present, but in a case where three retention parts are present, it is assumed that an additional one is formed to the upper right side of the retention part 40 (an additional one is formed in a state where each of the partition portion 52 and the middle portion 51 has one more shape. One more electric wire accommodation groove portion 41 or one more cable placement portion 42 is formed).

<Clamp 34>

In FIG. 1, the clamp 34 is formed as a portion that retains the cable 25 in the same manner as the clamp 33. The clamp 34 is positioned at predetermined distance away from the clamp 33. The clamp 34 according to the present embodiment is formed such that a center axis of a retention portion is positioned somewhat outward (to the left side in the drawings) with respect to a center axis of a retention portion of the clamp 33. The clamp 34 is formed to be positioned such that the cable 25 can be retained in a somewhat obliquely bent manner between the clamp 34 and the clamp 33. In a case where there is a variation in a length of the cable 25, the cable 25 can be easily curved in the shape of approximately the letter S. That is, the curving in the shape approximately the letter S can contribute to absorbing an extra length of the cable 25.

<Routing of Cable 25 and Plurality of Electric Wires 26>

Figure 5:
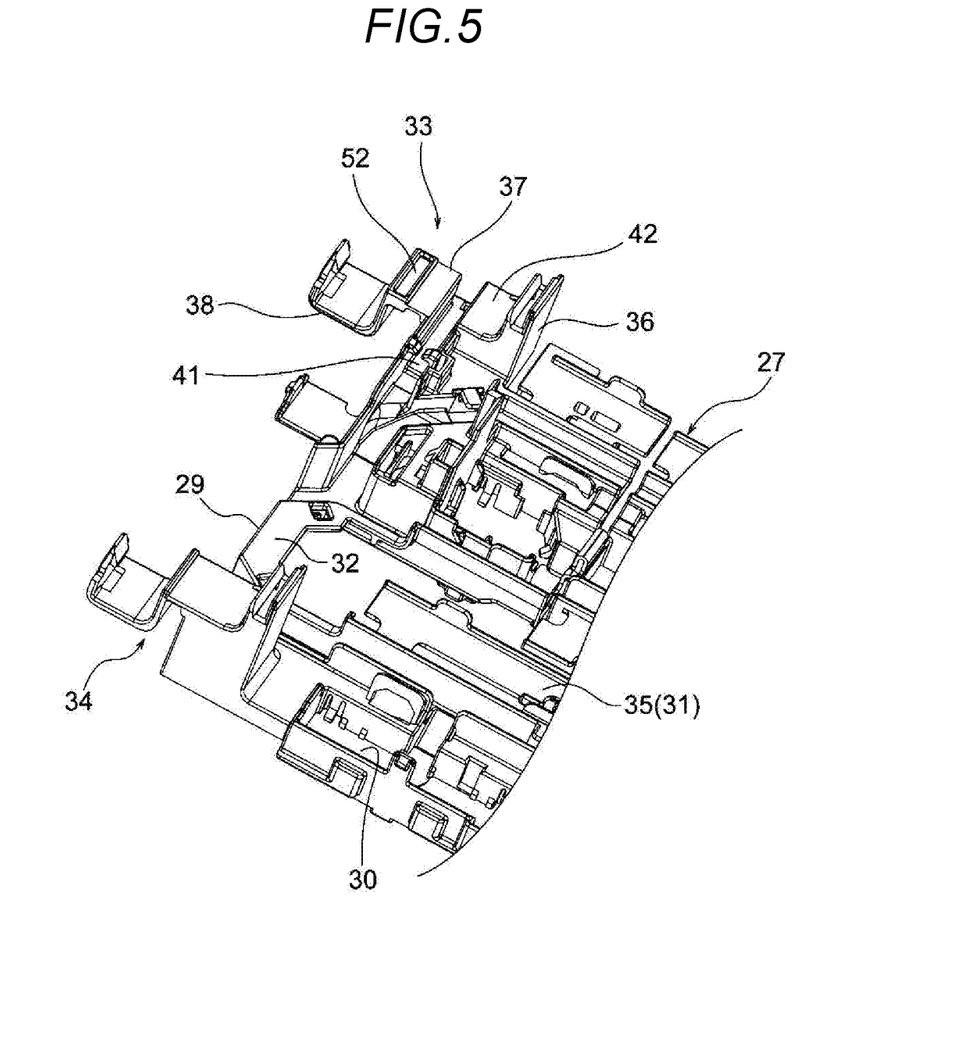
FIG. 5 is a perspective view (in which the clamp is opened and the cable and the electric wire are not present) of the clamp.
Figure 7:
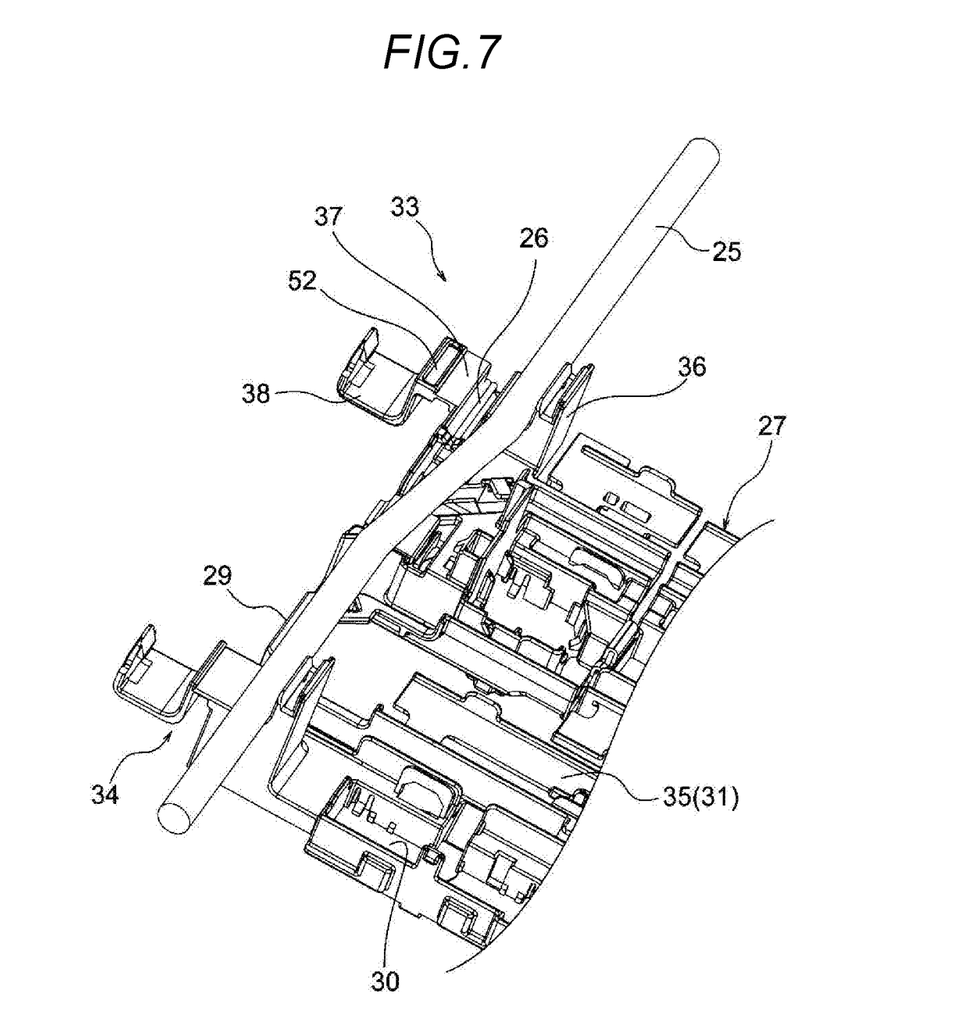
FIG. 7 is a perspective view (in which the clamp is opened and the cable and the electric wire are present) of the clamp.
Figure 8:
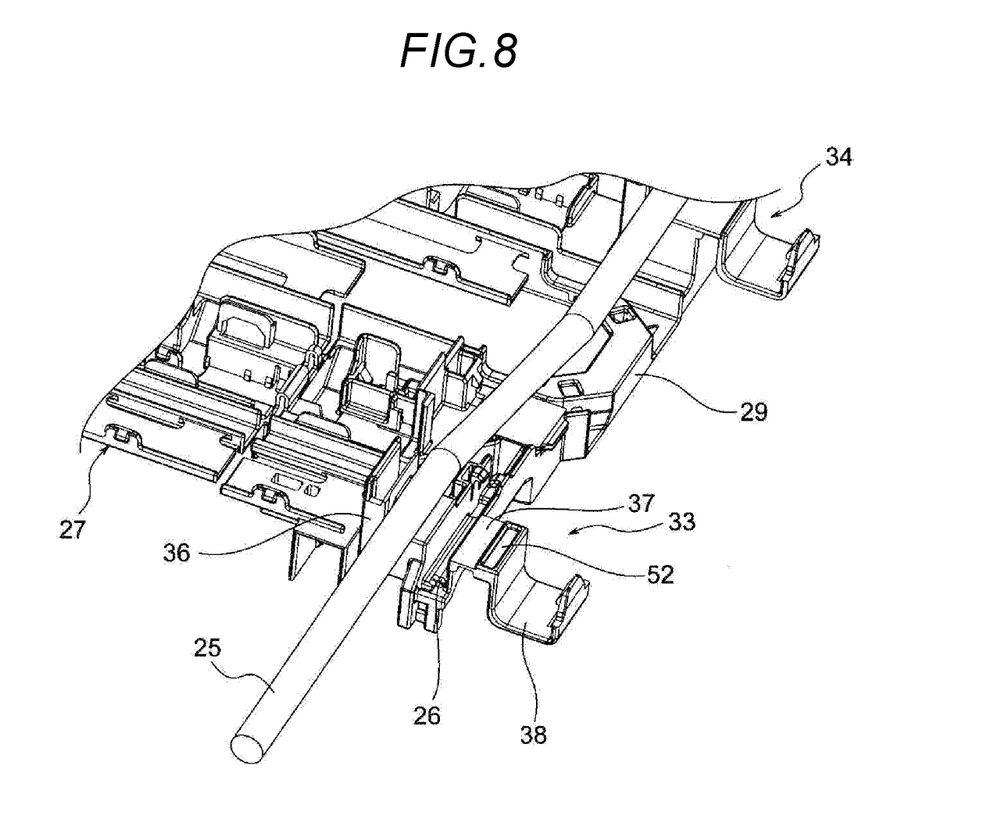
FIG. 8 is a perspective view (in which the clamp is opened and the cable and the electric wire are present) of the clamp.
Figure 9:
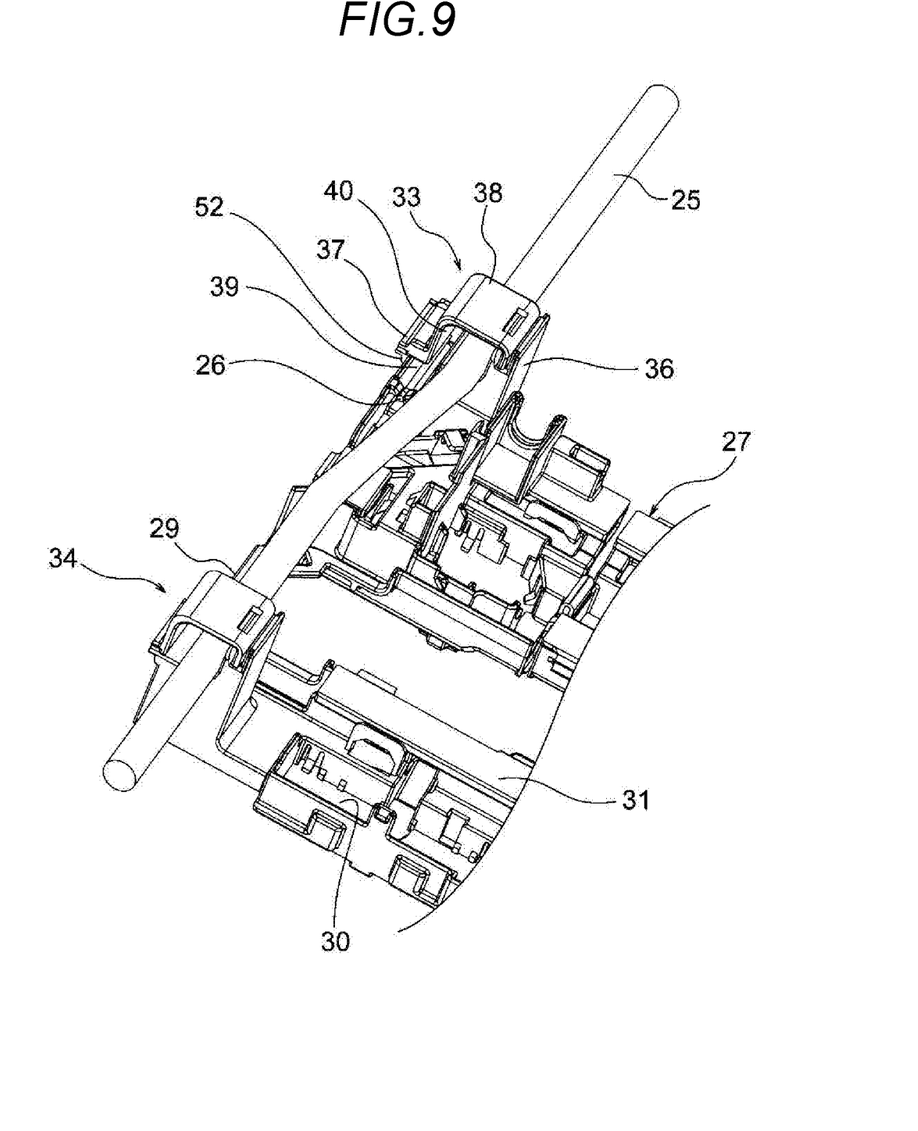
FIG. 9 is a perspective view (in which the clamp is opened) of the clamp.

In FIGS. 3, 5 and 6, the clamps 33 and 34 in a pair are opened and in this state, as illustrated in FIGS. 4, 7, and 8, the plurality of electric wires 26 and the cable 25 are placed. As illustrated in FIGS. 2 and 9, when each of the clamps 33 and 34 is closed, the routing of the cable 25 and the plurality of electric wires 26 is completed. With the clamp 33, an operation of accommodating the plurality of electric wires 26 and an operation of retaining the cable 25 can be performed at once.

As described above with reference to FIGS. 1A to 9, with the clamp 33 and the bus bar module 21 according to an embodiment of the present invention, an operation of engaging the clamp moving part 38 with the clamp base part 36 through the hinge part 37 is performed and thus, two retention parts 39 and 40 are formed in a state of being partitioned with the partition portion 52 of the clamp moving part 38. Accordingly, the operation of accommodating the plurality of electric wires 26 and the operation of retaining the cable 25 can be performed at once. Because two retention parts 39 and 40 are formed in the state of being partitioned with the partition portion 52, the cable 25 and the plurality of electric wires 26 can be prevented from being mixed.

Therefore, the clamp 33 that has excellent workability and the bus bar module 21 that has that clamp 33 can be achieved.

Of course, various modifications to the present invention is possibly made within the scope that does not depart from the nature and gist of the present invention.

That is, a formation destination of the clamp 33 is not limited to the resin plate 27 as a "structure" that is recited in Claim, and for example, it is assumed that a protector for a bus bar may be available and a flank surface of an apparatus may be available.

DESCRIPTION OF REFERENCE NUMERALS AND SIGNS

21: Bus bar module,
22: Battery assembly,
23: Bus bar,
24: Voltage detection terminal,
25: Cable,
26: Electric wire,
27: Resin plate (structure),
29: Short-end flank portion,
30: Bus bar accommodation part,
31: Electric wire accommodation part,
32: Bridge part,
33, 34: Clamp,
35: Lid,
36: Clamp base part,
37: Hinge part,
38: Clamp moving part,
39, 40: Retention part,
41: Electric wire accommodation groove portion,
42: Cable placement portion,
43: Cable support wall,
44: Base-side lock portion,
45: Die cutting hole,
46: Engagement opening,
47: Right flank wall,
48: Convex portion,
49: One end,
50: Other end,
51: Middle portion,
52: Partition portion,
53: Thinned portion,
54: Movable-side lock portion,
55: Die cutting hole,
56: Reinforcing rib

What is claimed is:

1. A clamp comprising:
    a clamp base part having a first stepped portion defining a first corner edge;
    a hinge part that is formed on a thinned portion connected continuously to the clamp base part;
    a unitary clamp moving part having a second stepped portion defining a second corner edge; and
    a plurality of retention parts formed in a state that the clamp moving part is engaged with the clamp base part;
    wherein the clamp base part is provided on a structure in which a cable and/or an electric wire is routed and formed such that the cable and/or the electric wire is placed thereon,
    wherein one end of the clamp moving part is connected continuously to the hinge part, the other end of the clamp moving part is engaged with the clamp base part, and one of the cable and/or the electric wire is covered by a part of the clamp moving part that extends from the one end to a middle portion thereof,
    wherein the first corner edge of the first stepped portion and the second corner edge of the second stepped portion are positioned between the plurality of retention parts, and
    wherein one or multiple partition portions, which is positioned between adjacent two retention parts of the plurality of retention parts, are formed on the clamp moving part such that the other of the cable and the electric wire is partially covered by the one or multiple partition portions on the clamp moving part in the state that the clamp moving part is engaged with the clamp base part.

2. The clamp according to claim 1, wherein the middle portion has a L shape.

3. A bus bar module comprising:
a plurality of bus bars connecting adjacent battery cells in a battery assembly in series;
a resin plate including a plurality of bus bar accommodation parts which accommodate and fix the bus bars and which are arranged in the longitudinal direction,
wherein the clamp according to claim 1 is integrally formed with the resin plate.

4. The bus bar module according to claim 3, wherein the resin plate includes the plurality of bus bar accommodation parts, a plurality of electric wire accommodation parts, and a plurality of bridge parts.

5. The clamp according to claim 1, wherein both the cable and the electric wire are simultaneously covered by the clamp moving part in the state that the clamp moving part is engaged with the clamp base part by operation of the hinge part.

6. The clamp according to claim 1, wherein the one or multiple partition portions separates the cable and the electric wire in the state that the clamp moving part is engaged with the clamp base part.

7. The clamp according to claim 6, wherein the one or multiple partition portions impedes the electric wire from moving to a side of the retention parts of the cable.

8. The clamp according to claim 1, wherein the one or multiple partition portions are formed such that a number of partition portions is obtained by subtracting 1 from a sum of a number of the plurality of retention parts.

9. The clamp according to claim 1, wherein one or multiple partition portions is formed such that an opening portion in the retention part of the electric wire is opened.

10. The clamp according to claim 9, wherein the opening portion in the retention part of the electric wire is partially opened and a gap that has a smaller diameter than the electric wire occurs.

* * * * *